United States Patent
Fukushima (10) Patent No.: US 7,239,404 B2
(45) Date of Patent: Jul. 3, 2007

(54) PRINTER PRINTING AN UNPRINTED SURFACE OF A PREVIOUSLY-PRINTED PRINT SHEET

(75) Inventor: Kimihiro Fukushima, Ebina (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 958 days.

(21) Appl. No.: 10/166,701

(22) Filed: Jun. 12, 2002

(65) Prior Publication Data

US 2003/0025929 A1 Feb. 6, 2003

(30) Foreign Application Priority Data

Jun. 12, 2001 (JP) .............................. 2001-176468

(51) Int. Cl.
*G06K 15/00* (2006.01)
*G06K 1/00* (2006.01)

(52) U.S. Cl. ...................................... 358/1.14; 358/1.9
(58) Field of Classification Search ......... 358/1.1–1.18
See application file for complete search history.

(56) References Cited

U.S. PATENT DOCUMENTS 5,452,058 A * 9/1995 Umeda ........................ 399/15

5,982,956 A 11/1999 Lahmi

FOREIGN PATENT DOCUMENTS

| DE | 696 08 553 T2 | 2/2001 |
| JP | 11-509995 | 8/1999 |
| JP | A-2000-159410 | 6/2000 |

\* cited by examiner

*Primary Examiner*—Douglas Q. Tran
(74) *Attorney, Agent, or Firm*—Antonelli, Terry, Stout & Kraus, LLP.

(57) ABSTRACT

Even if printing is carried out on an unprinted surface of a print sheet containing confidential information, the confidential information is prevented from leaking out, thereby increasing reuse rate. To achieve this, both print data instructed by a host apparatus and an already printed print sheet have a security level of print contents and manager information on the print matter as print matter attributes. Then, when the print data is printed on an unprinted surface, it is determined whether the print data can be printed on a fed print sheet, from the print matter attributes of the print data and of the print sheet. Further, print sheets are prepared beforehand every print matter attributes and a print sheet to be fed is selected on the basis of the print matter attributes of the print data.

14 Claims, 10 Drawing Sheets

|  | PRINT SHEET | | |
|---|---|---|---|
|  | SECTION CONFIDENTIAL | COMPANY CONFIDENTIAL | UNRESTRICTED |
| PRINT INFORMATION / SECTION CONFIDENTIAL | ○ | ○ | ○ |
| PRINT INFORMATION / COMPANY CONFIDENTIAL | × | ○ | ○ |
| PRINT INFORMATION / UNRESTRICTED | × | × | ○ |

○ : PRINTABLE    × : UNPRINTABLE

FIG. 13

|  | | PRINT SHEET | | | |
|---|---|---|---|---|---|
|  | | SECTION CONFIDENTIAL | | COMPANY CONFIDENTIAL | UNRESTRICTED |
|  | | SECTION A | SECTION B | | |
| PRINT INFORMATION | SECTION CONFIDENTIAL / SECTION A | ○ | × | ○ | ○ |
| PRINT INFORMATION | SECTION CONFIDENTIAL / SECTION B | × | ○ | ○ | ○ |
| PRINT INFORMATION | COMPANY CONFIDENTIAL | × | × | ○ | ○ |
| PRINT INFORMATION | UNRESTRICTED | × | × | × | ○ |

○ : PRINTABLE    × : UNPRINTABLE

PRINTER PRINTING AN UNPRINTED SURFACE OF A PREVIOUSLY-PRINTED PRINT SHEET

BACKGROUND OF THE INVENTION

The present invention relates to a printing system which can be suitably used to secure confidential information or the like contained in print sheets and to reuse print sheets having one side thereof already used.

In recent years, from the perspectives to protect environments, save resources, and reduce expenses, attempts have been increased to effectively use print sheets by printing one side of the print sheet of which the other side is already printed, that is, unused side of the print sheet. However, if confidential information is contained in the print result printed on the used side of the sheet, there are possibilities that the confidential information may leak out. Therefore, there is a problem that in order to avoid the information leak out, it is necessary to check whether or not print sheets to be reused contain confidential information and then remove those used print sheets which contain confidential information.

To solve such problem, for example, JP-A-2000-159410 specification proposes a sheet sorting apparatus that beforehand registers and stores a particular mark such as "Company Confidential" which indicates containment of confidential information, and switches over a print sheet transportation path to a shredder side to inhibit a used print sheet from being reused when the particular mark is detected on at least one side thereof.

SUMMARY OF THE INVENTION

In general, print sheets containing confidential information have several security levels (ranges). For example, these include a security level A at which confidential information must be secured only within a particular range of a certain section of a certain company, a security level B at which the confidential information must be secured only within the certain section of the certain company, and a security level C at which the confidential information must be secured only within the certain company. Then, for example, print sheets with the security level B, at which the confidential information must be secured only within the certain section of the certain company, can be reused as those which have one side thereof already used provided that the sheets are ensured to be used only within that section of that company. In the prior art, however, when a particular mark indicative of containment of confidential information is detected, the reuse of the print sheets is inhibited without exception. Thus, there is a problem that reuse rate of the used sheets becomes low.

It is an object of the present invention to provide a printer which serves to increase the reuse rate of used sheets while securing confidential information when printed sheets containing confidential information are reused as used print sheets.

To attain this object, the present invention includes the steps of inputting print data and print matter attribute information on the print data instructed by a host apparatus, feeding a print sheet on which the print data is to be printed, and then detecting print matter attributes of the print sheet. Here, the print matter attributes include, for example, the security level of print contents and a manager of the print matter. Then, it is determined whether or not the print data can be printed, from the print matter attribute information on the print data instructed by the host apparatus and the print matter attribute information detected from the print sheet. Whether or not the print data can be printed is determined by, for example, comparing the security level of the print data with the security level of the print sheet. When the former is equal to or higher than the latter, the print data is printed. Furthermore, if the print matter attributes comprise the security level and the manager of the print matter, the print data is not printed when the manager of the print matter differs between the print data and the print sheet, even if the security levels are identical.

When the print data is not printed as a result of the determination from the print matter attributes, the fed print sheet is returned to a sheet feeding section, thereby increasing the reuse rate.

Further, for a printer having a plurality of sheet feeding sections, print sheets are sorted out and stored beforehand on the basis of the print matter attributes and print sheets that can be printed are selected on the basis of the print matter attributes of the print data to perform printing. This eliminates the need for sheet refeeding resulting from the inconsistency between the print matter attributes of the print data and of each print sheet, thereby preventing print speed from decreasing.

When the print data is printed, a print matter attribute mark is printed on each print sheet on the basis of the print data and the print matter attribute information on the print data instructed by the host apparatus. This enables detection of the print matter attributes such as the security level of already printed contents and the manager information at the time of reusing the print sheet. Here, the print matter attribute mark is a printed bar code or a printed invisible mark such that the print matter attributes such as the security level cannot be read at a glance, thereby effectively preventing confidential information from leaking out.

Furthermore, the confidential information is further effectively prevented from leaking out by sorting out and discharging the print sheets according to the print matter attributes after printing.

Other objects, features and advantages of the invention will become apparent from the following description of the embodiments of the invention taken in conjunction with the accompanying drawings.

DETAILED DESCRIPTION OF THE PREFERRED EMBODIMENTS

With reference to the drawings, description will be given of an embodiment of a printing system that provides print sheets which have attributes indicative of the security level of the confidential information and which serve to inhibit a person from determining at a glance that the print sheets have print data containing confidential information, thereby improving the reuse rate of used sheets while securing the confidential information when the print sheets containing the confidential information are reused as used ones.

Figure 1:
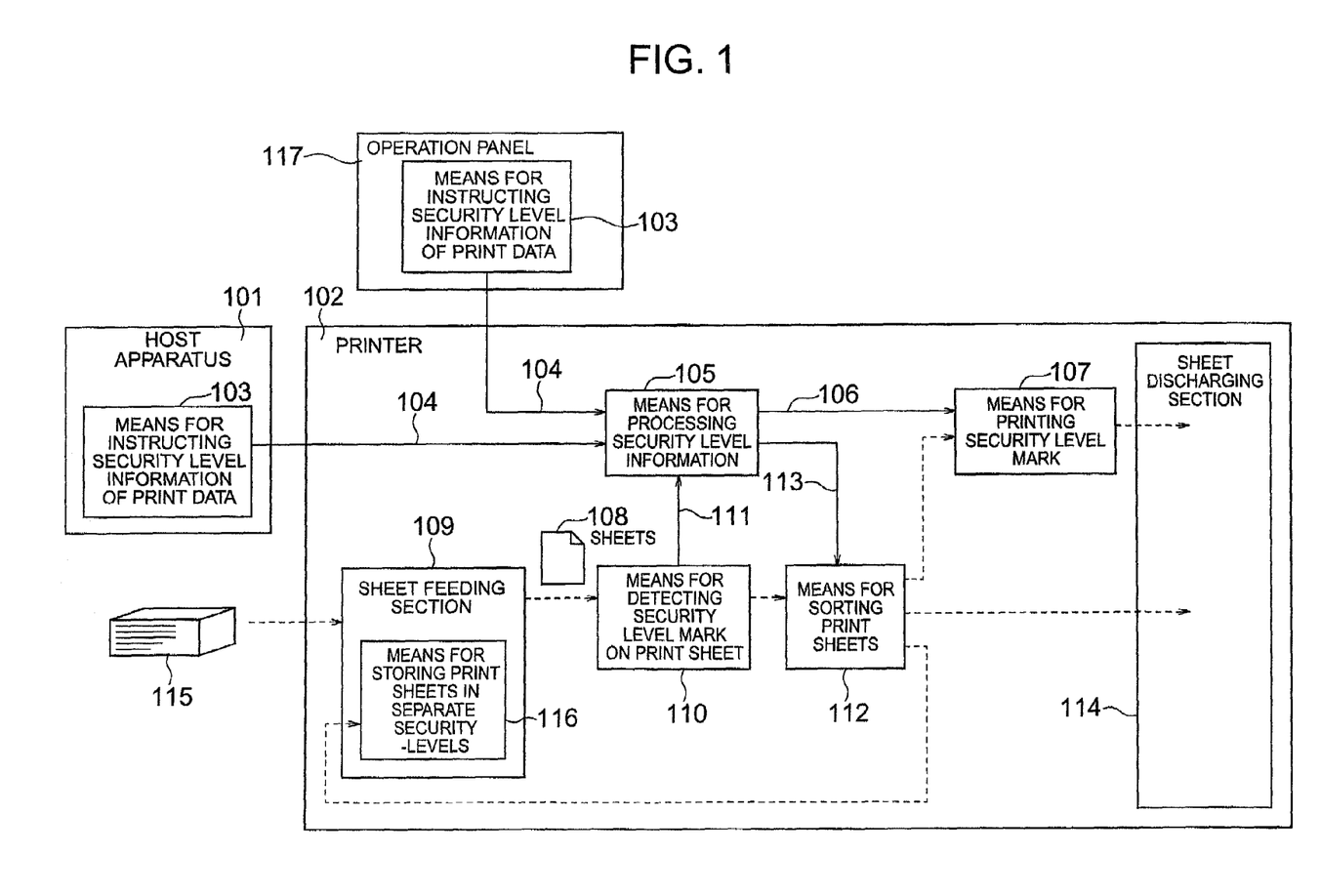
FIG. 1 is a block diagram showing an entire configuration of an embodiment of the present invention and functions thereof.

FIG. 1 is a block diagram showing an entire configuration of the embodiment of the present invention and functions thereof. In FIG. 1, arrows shown by solid lines denote a flow of information, and arrows shown by dotted lines denote a flow of a print sheet. The printing system of the present invention comprises a host apparatus 101 that transmits print control information such as a print instruction as well as print data, and a printer 102 that prints print sheets on the basis of the print control information such as the print instruction as well as the print data which have been transmitted by the host apparatus 101. The printer 102 is, for example, a laser beam printer or an ink jet printer or may be a printer based on another printing method, and the host apparatus 101 and the printer 102 may be connected together directly or via a network such as the LAN.

In this configuration, the host apparatus 101 has means 103 for instructing print data security level information 104, which is indicative of the security level of print data to be printed, to the printer 102 together with the print control information and the print data. The print data security level information 104 is indicative of the level (range) of confidentiality of print data to be printed and includes, for example, a security level A at which confidential information must be secured only within a particular range of a certain section of a certain company, a security level B at which the confidential information must be secured only within the certain section of the certain company, a security level C at which the confidential information must be secured only within the certain company, and a security level D at which the print data contains no confidential information. The level (range) of confidentiality of each security level or the number of security levels can be arbitrarily determined by a user, and a method of classifying security levels is beforehand determined. However, the range of a higher security level must be contained in the range of a lower security level. That is, the range of the security level A is contained in the range of the security level B, and the range of the security level B is contained in the range of the security level C. Further, print data containing no confidential information is classified into the lowest security level, so that each print sheet can belong to one of the security levels. The print data security level information 104 is instructed for each print job or for each page within the print job, so that the security level information on all the printed pages is provided to the printer 102.

The printer 102 processes the print data security level information 104 by using means 105 for processing security level information. The security level information processing means 105 generates security level mark print data 106 for each printed page on the basis of the transmitted security level information. Subsequently, the generated security level mark print data 106 is transmitted to means 107 for printing a security level mark. Then, the security level mark is printed on a print sheet together with the print data of the print job.

On the other hand, a sheet feeding section 109 has a bunch 115 of print sheets set therein and having one side thereof already used. When a print sheet 108 with one side thereof already used is fed from the sheet feeding section 109 on the basis of print control information such as a print instruction transmitted by the host apparatus 101, the sheet 108 is transported to means 110 for detecting print sheet security level mark. The print sheet security level mark detecting means 110 is structure by, for example, a mark reading sensor to detect the security level mark printed on the fed one-side-used print sheet 108 and then communicate print sheet security level mark data 111 to the security level information processing means 105. Then, the one-side-used print sheet 108 is transported to means 112 for sorting print sheets.

The security level information processing means 105 executes a process of comparing the print data security level information 104 with the print sheet security level mark data 111, communicated by the print sheet security level mark detecting means 110, in parallel with generation of the above described security level mark print data 106. That is, for the printing page, it is determined which of the print data to be printed and the already printed print data has a host security level. Then, print sheet sorting control information 113, which is used to control sorting of print sheets, is communicated to the print sheet sorting means 112 on the basis of the result of the comparison of the security level. When the security level of the print data is higher than or the same as that of the print sheet, then it is determined that the fed one-side-used print sheet 108 is suitable for printing the print data of this page, and print sheet sorting control information 113 indicating that this print sheet can be reused is communicated to the print sheet sorting means 112. On the other hand, when the security level of the print data is lower than that of the print sheet, then it is determined that the fed one-side-used print sheet 108 is unsuitable for printing the print data of this page, and print sheet sorting control information 113 indicating that this print sheet should be inhibited from being reused is communicated to the print sheet sorting means 112.

The print sheet sorting means 112 has a function of sorting out print sheets to sort out the transported one-side-used print sheet 108 on the basis of the print sheet sorting control information 113 conveyed by the security level information processing means 105. Upon receiving the print sheet sorting control information 113 indicating that this print sheet can be reused, the print sheet sorting means 112 transports the one-side-used print sheet 108 to the security level mark printing means 107. The security level mark printing means 107 prints the security level mark on the print sheet, while simultaneously printing the print data of the print job thereon, and the print sheet is discharged to a sheet discharging section 114. Further, upon receiving the print sheet sorting control information 113 indicating that this print sheet should be inhibited from being reused, the print sheet sorting means 112 directly discharges the one-side-used print sheet 108 to the sheet discharging section 114 or transports it to the print sheet storing means by security levels 116 for storing print sheets according to their security levels, thereby inhibiting the one-side-used print sheet 108 from being printed. In this case, the sheet feeding section 109 feeds another one-side-used print sheet 108, and the following operations are performed again: recognition of the security level of the print sheet by the print sheet security level mark detecting means 110, comparison of the security levels by the security level information processing means 105, and sorting-out of the sheet by the print sheet sorting means 112. Then, this process is repeated until a print sheet suitable for printing the print data of this page is detected.

The entire configuration of the embodiment of the present invention is as described above, but as long as the functions of the present invention are carried out, a copier may be used instead of the printer 102. In this case, the print data security level information instructing means 103, which provides the print data security level information 104, may be provided in an operation panel 117 from which a user instructs execution of copying or a form of copying. Further, even in a case of the printer 102, the print data security level information instructing means 103 may also be provided in the operation panel 117. With this, it is possible to perform the present printing system without modifying a conventional host apparatus.

Figure 2:
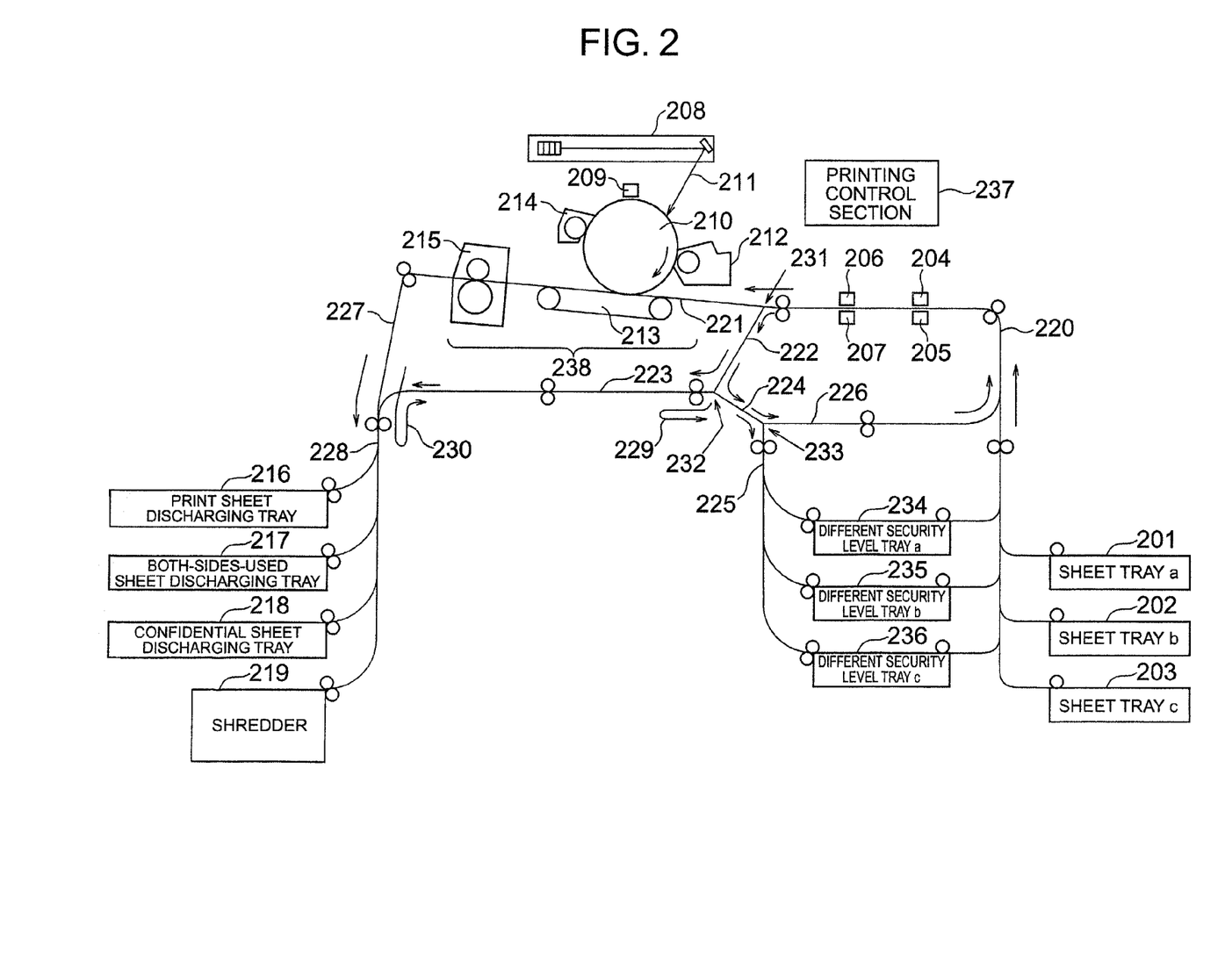
FIG. 2 is a schematic sectional view showing an internal structure of a printer.

FIG. 2 is a schematic sectional view showing an internal structure of the printer constituting the present printing system. The embodiment of the printer will be described taking a laser beam printer by way of example. However, the printer is not limited to the laser beam printer but may be one based on another printing method or a copier as described above. The mechanism of the printer is as follows. Reference numerals 201, 202, and 203 denote sheet trays in which print sheets are stored. Reference numerals 204 and 205 denote sensors for detecting whether or not surfaces of a fed print sheet have been used. Reference numerals 206 and 207 denote security level mark readers that detect the security level mark printed on the fed print sheet. Reference numeral 208 denotes an optical unit that irradiates a photosensitive drum 210, which has been uniformly charged by a charger 209, with a laser beam 211. Reference numeral 212 denotes a developing machine that uses toner to develop an electrostatic latent image formed on the photosensitive drum 210. Reference numeral 213 denotes a transfer belt that transfers a toner image on the photosensitive drum 210 to a print sheet. Reference numeral 214 denotes a cleaner that removes toner remained on the photosensitive drum 210. Reference numeral 215 denotes a fixer that fixes, by thermocompression bonding, the toner image transferred to the print sheet. Reference numerals 216, 217, and 218 denote sheet discharging trays. Specifically, reference numeral 216 denotes a print sheet discharging tray into which printed sheets are discharged, reference numeral 217 denotes a both-sides-used sheet discharging tray into which print sheets having both sides thereof already used are discharged, and reference numeral 218 denotes a confidential sheet discharging tray into which print sheets having confidential information printed on an used side thereof and having the opposite side thereof unused are discharged. For example, the confidential sheet discharging tray 218 may be locked so that only authorized people can handle the print sheets discharged into this tray. Reference numeral 219 denotes a shredder that cuts out the print sheets having confidential information printed on an used side thereof. Reference numerals 220 to 228 denote sheet transportation paths, and in particular, parts shown at 229 and 230 are switchback mechanisms having a function of turning over the print sheets. Further, reference numerals 231, 232, and 233 denote sheet transportation path branching mechanisms that select the print sheet transportation paths. Reference numerals 234, 235, and 236 denote trays by security levels in which sorted-out one-side-printed print sheets are stored with different security levels and from which print sheets can be fed instead of the sheet feeding trays 201, 202, and 203 during a printing operation. For example, the trays by security levels 234, 235, and 236 may be locked so that only authorized people can handle the print sheets stored in these trays. Reference numeral 237 denotes a print control section that controls printing on the basis of print control information, controls the entire printer, specifically, sheet transportation operations, generates print data, and so on.

Figure 3:
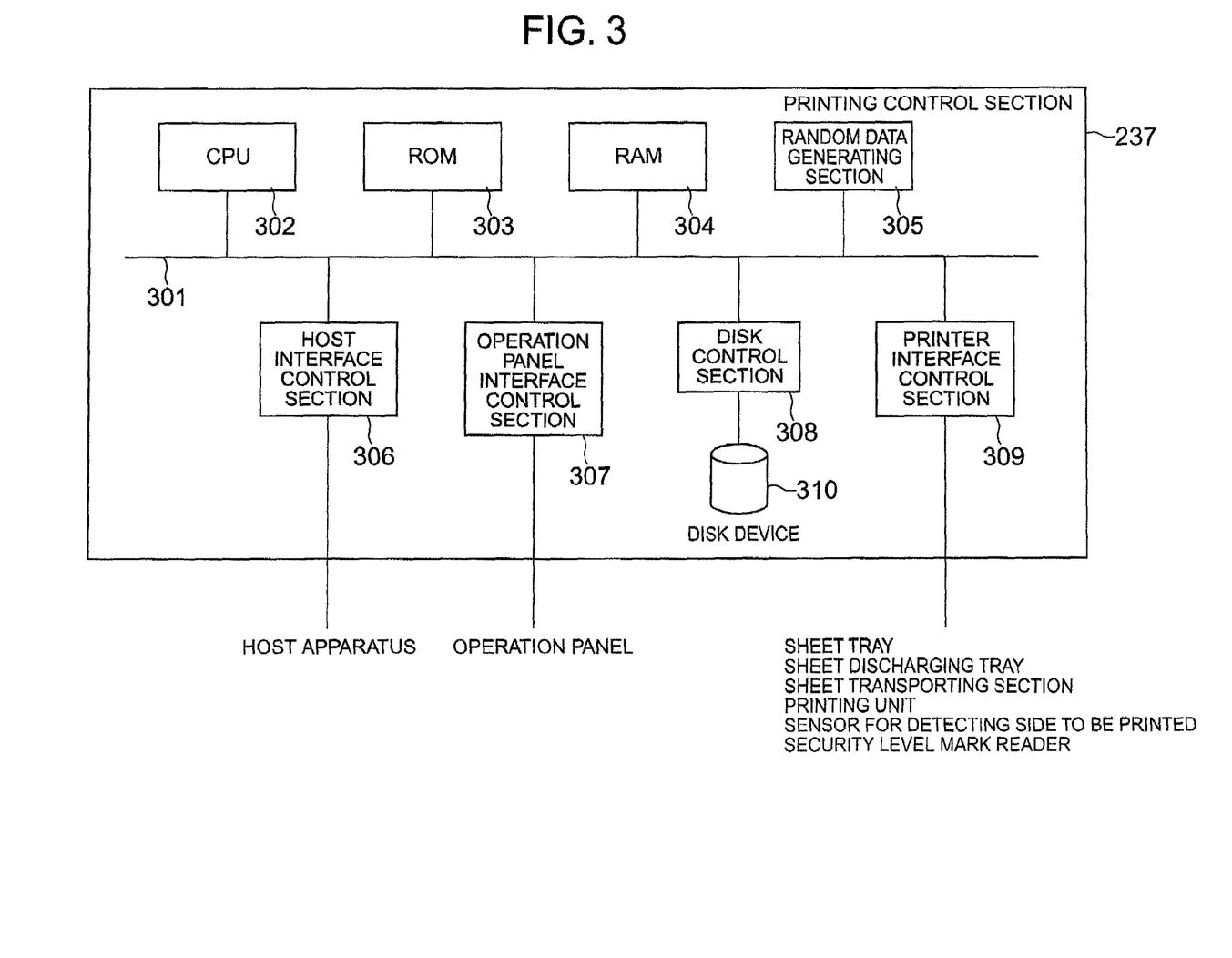
FIG. 3 is a block diagram showing a configuration of a print control section.

FIG. 3 is a block diagram showing a configuration of the print control section 237, provided in the printer constituting the present printing system. The print control section 237 is constructed as follows: Reference numeral 302 denotes a CPU that executes a control program to control the whole of the printer. Reference numeral 303 denotes a ROM that stores a part of the control program which relates to printing, various data required to execute the control program, or the like. Reference numeral 304 denotes a RAM that stores the control program and various data required to execute the control program or temporarily stores print data for an expansion process or the like. Reference numeral 305 denotes a random data generating section having a function of generating random data. Reference numeral 306 denotes a host interface control section connected to the host apparatus for communications. Reference numeral 307 denotes an operation panel interface control section connected to the operation panel for communications. Reference numeral 308 denotes a disk control section that controls a disk device 310 such as a magnetic disk or an optical disk. The disk device 310 stores the control program, various data required to execute the control program, font data, security level mark pattern data, and other data. Reference numeral 309 denotes a printer interface control section connected to the sheet trays, sheet discharging trays, sheet transportation section, printing unit, printed surface detecting sensor, security level mark reader, and others to control operations and execute communications. Reference numeral 301 denotes a system bus to which the CPU 302 in the print control section 237 and other sections are connected to transfer data.

Figure 4:
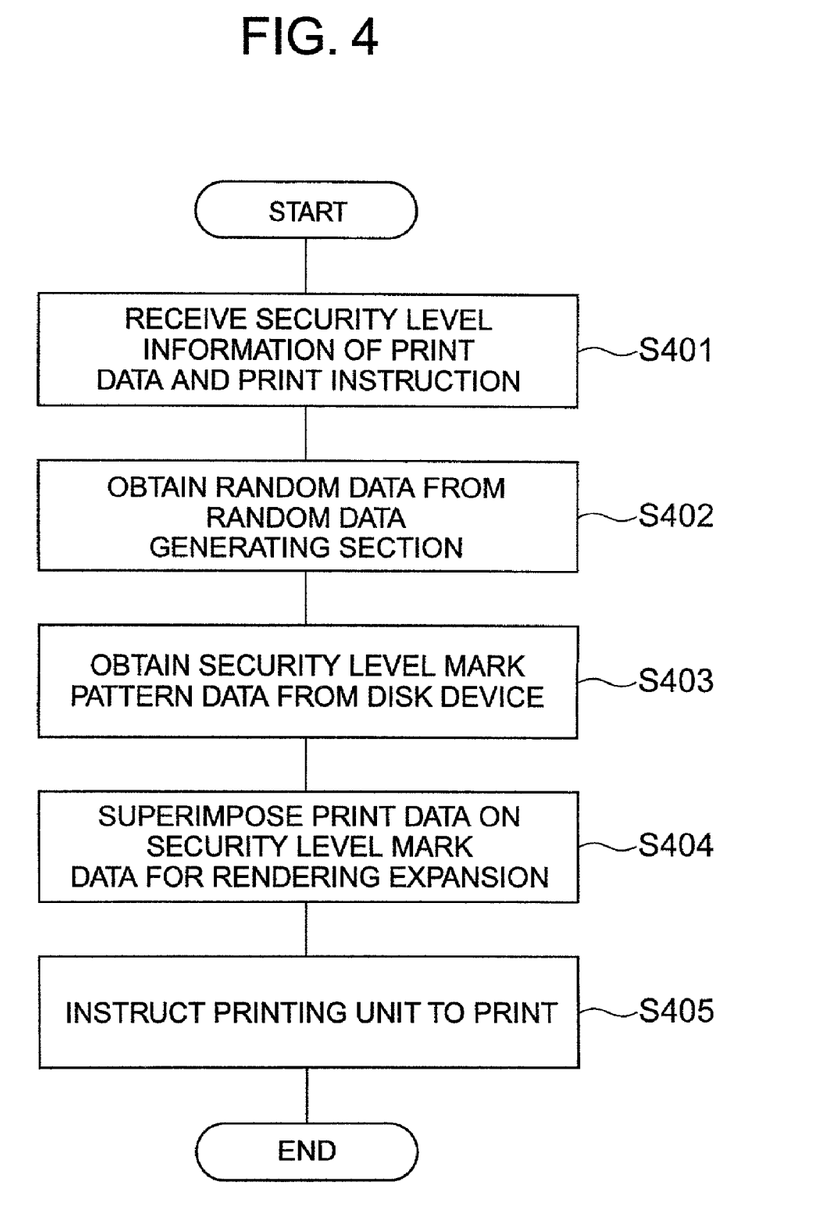
FIG. 4 is a flow chart showing an operation performed by the print control section to print a security level mark on a print sheet.

With reference to the flow chart shown in FIG. 4, an operation will be described which is performed by the print control section to print the security level mark on a new sheet or a used print sheet when the printer is constructed as shown in FIG. 2 and when the print control section is constructed as shown in FIG. 3. Upon receiving print data security level information and a print instruction for both-sides or one-side printing from the host apparatus or operation panel (S401), the CPU 302 obtains random data from the random data generating section 305 (S402). Then, the CPU 302 obtains security level mark pattern data based on the received print data security level information, from the disk device 310 via the disk control section 308 (S403). The disk device 310 has a large number of security level mark pattern data classified and stored for each security level. Further, all of the security level mark patterns are inherent. To read out security level mark pattern data from the disk device 310, the random data obtained from the random data generating section 305 is inserted into a part of an address, and security level mark pattern data is randomly read out and obtained from an area of the storage device which stores the security level mark pattern data for the security level specified in the print data security level information. Thus, the security level mark to be printed on each print sheet varies with the sheets in different security levels as a matter of course and even in the same security level, so that it is difficult to determine at a glance whether or not the print data contains confidential information. Hereupon, as a device to store security level mark pattern data, a disk device is taken as an example, but a ROM or another storage means may be used. Further, instead of storing security level mark pattern data in the storage device beforehand, a method to generate security level mark pattern data for each printing operation and sequentially register the data in the storage device or the like may be employed. The obtained security level mark pattern data is superimposed on the print data for rendering drawing expansion (S404), and an instruction is given to the printing unit 238 (S405) to carry out printing.

Figure 5:
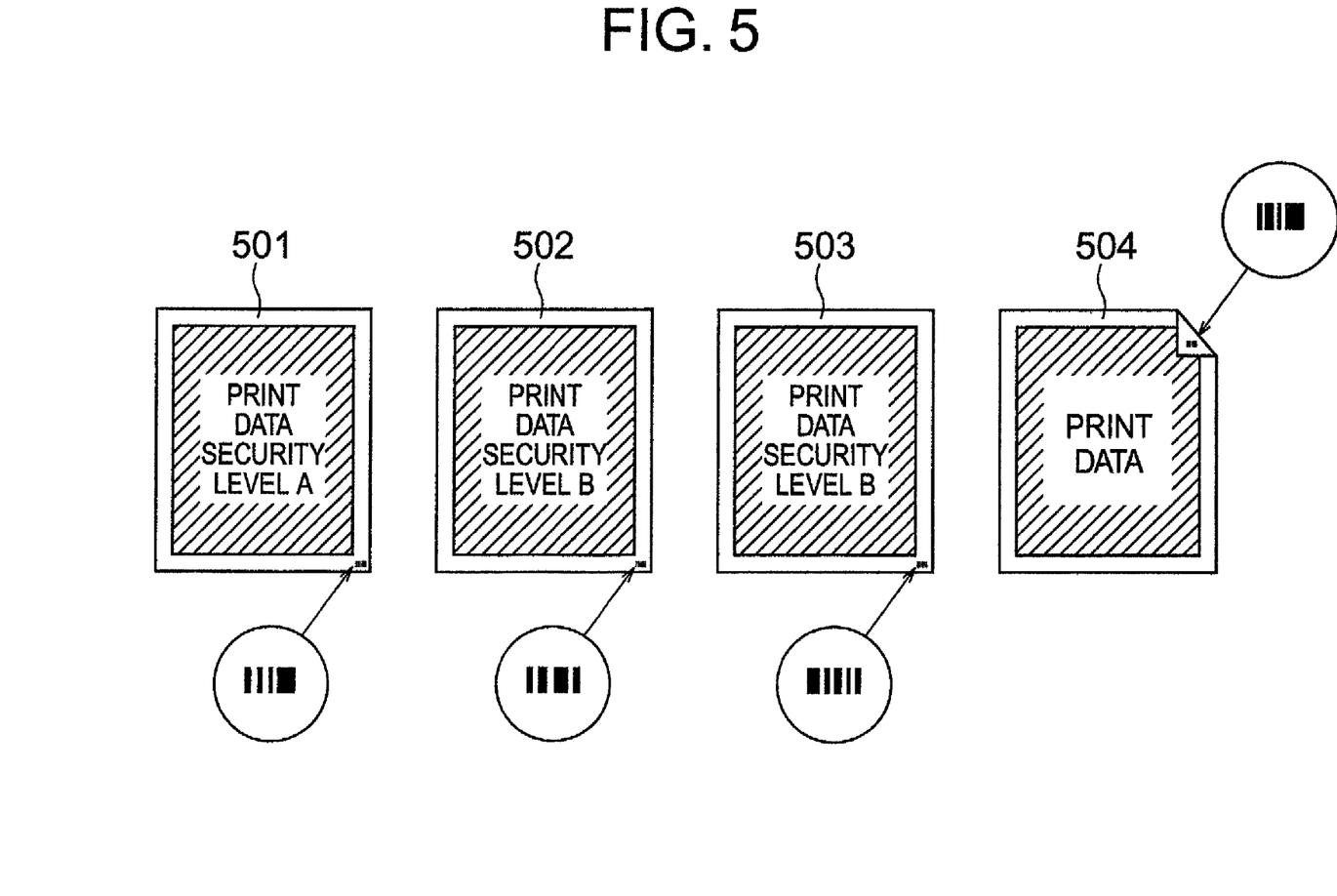
FIG. 5 is a view showing examples of print sheets on which the security level mark has been printed.

FIG. 5 shows examples of print sheets having security level marks printed thereon. Reference numeral 501 denotes an example of a print sheet on which print data with a security level A is printed, and reference numerals 502 and 503 denote examples of sheets on which print data with a security level B is printed. The print sheets have security level marks of different patterns printed thereon, so that one glance does not allow determination of the number of security levels, in other words, whether or not the print data contains confidential information. Further, as shown in a sheet 504, a manner in which a surface or a position which the security level mark is printed is arbitrarily determined by a user may be employed, and a manner in which an ink or color of a toner used to print the security level mark is arbitrarily determined by a user may be employed. Particularly, in a printer using ink, a manner may be employed in which the security level mark is printed by special ink and the security level mark is normally invisible and becomes visible when the print sheet is irradiated with ultraviolet rays. Some users may not desire to print the security level mark on the print sheet, and in this case, the system may be adapted so that the user can arbitrarily determine whether or not to print the security level mark. These arbitrary determination by the user are carried out from the host apparatus or the operation panel.

Figure 6:
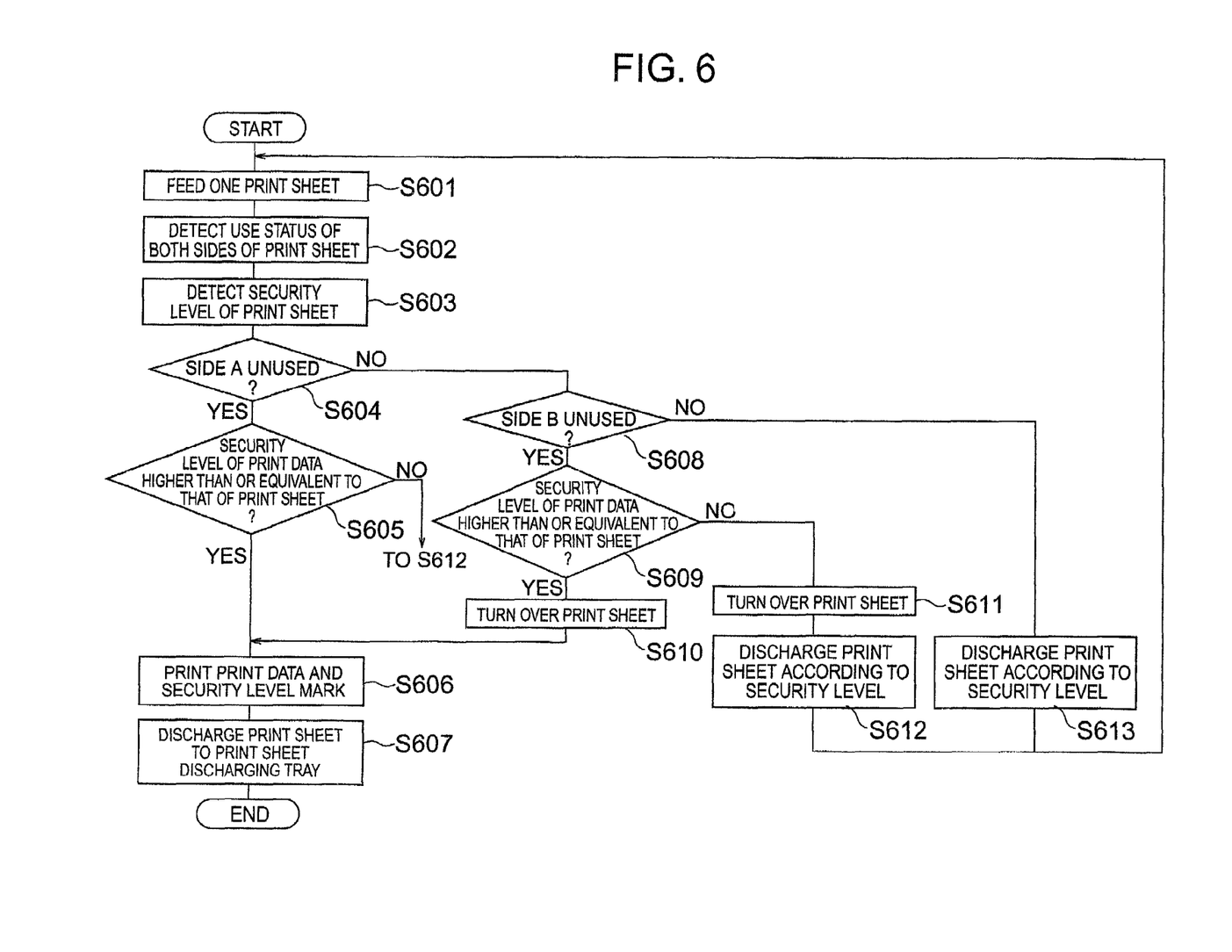
FIG. 6 is a flow chart showing an operation performed by the printer to print one side of a used print sheet.

Next, with reference to a flow chart shown in FIG. 6, an operation will be described which is performed by the printer to print one side of a used print sheet when the printer is constructed as shown in FIG. 2 and when the print control section is constructed as shown in FIG. 3. In the following description, in an area in which the printed surface detecting sensors a 204 and b 205 shown in FIG. 2 are installed, a top side of the print sheet is defined as a "side A", whereas a bottom side thereof is defined as a "side B". Upon receiving, from the host apparatus or operation panel, the print data security level information and a print instruction for one-side printing using a used print sheet, a sheet is fed from one of the sheet trays a 201, b 202, and c 203 on the basis of print control information (S601). In accordance with designation of the type of the sheet to be used, such as a new sheet or a used sheet, and designation of the sheet tray, a printing tray to which the sheet is fed is determined. The fed print sheet is transported along the sheet transportation path a 220. Then, when the print sheet passes through the area in which the printed surface detecting sensors a 204 and b 205 are provided, the sensors a 204 and b 205 scan the sides A and B of the print sheet to detect whether or not each printed surface has already been used (S602) and notify the print control section 237 of the result of the detection. When the print sheet is further transported and passes through an area in which the security level mark readers a 206 and b 207 are provided, the readers a 206 and b 207 detect the security level mark printed on the print sheet (S603) and notify the print sheet security level mark data to the print control section 237.

In the print control section 237, the CPU 302 checks, via the disk control section 308, the notified print sheet security level mark data against the security level mark pattern data stored in the disk device 310 to recognize the security level of the print sheet. Then, the print control section 237 determines whether or not the fed print sheet is suitable for printing on the basis of the notified attributes of the print sheet such as the use status of each printed surface of the print sheet and the security level thereof as well as security level information of the print data.

First, it is judged whether or not the side A is unused (S604). If the side A is unused, the security level of the print data is compared with the security level of the print sheet (S605). If a plurality of security level marks are detected by the security level mark readers, the highest level among the detected security levels is deemed as the security level of this print sheet. If no security level mark is detected or an undefined security level mark is detected, then this print sheet is deemed to have the lowest security level. If the security level of the print data is higher than or equivalent to that of the print sheet, it is determined that the fed print sheet is suitable for printing. Then, the transportation path branching mechanism a 231 feeds the print sheet to the sheet transportation path b 221, and the printing unit 238 performs a series of printing operations including charging of the photosensitive drum 210 by the charger 209, application of a print pattern image by the optical unit 208, development of an electrostatic latent image by the developing machine 212, transfer of the image to the print sheet by the transfer belt 213, and fixation of toner by the fixer 215 (S606). At this time, in addition to the print data, the security level mark, which is indicative of the security level of the print data, is printed (S606). This is the same as that described above. The print sheet passes through the sheet transportation paths h 227 and i 228 to be discharged to the print sheet discharging tray 216 (S607).

If the fed print sheet has the side A thereof already used, it is judged whether or not the side B thereof is unused (S608). If the side B is unused, the security level of the print data is compared with the security level of the print sheet (S609). If a plurality of security level marks is detected by the security level mark readers, the highest level among the detected security levels is deemed as the security level of this print sheet. If no security level mark is detected or an undefined security level mark is detected, then this print sheet is deemed to have the lowest security level. These are the same as those described above. If the security level of the print data is higher than or equivalent to that of the print sheet, it is determined that the fed print sheet is suitable for printing but that a side to be printed is set in an opposite direction. Then, the transportation path branching mechanism a 231 feeds the print sheet to the sheet transportation path c 222, the transportation path branching mechanism b 232 further feeds the print sheet to the sheet transportation path d 223, and the switch back mechanism a 229 reverses the print sheet (S610). Then, while the print sheet is travelling through the sheet transportation paths e 224, g 226, a 220, and b 221, the printing unit 238 performs a series of printing operations (S606). At this time, in addition to the print data, the security level mark, which is indicative of the security level of the print data, is printed (S606). This is the same as that described above. During this process, the print sheet passes through the areas in which the printed surface detecting sensors and the security level mark readers are installed, but the printed surface detecting sensors and the security level mark readers need not be operated because the attributes of the print sheet have already been recognized. After the printing operation, the print sheet is discharged to the print sheet discharging tray 216 via the sheet transportation paths h 227 and i 228 (S607) similarly as the previous description.

Figure 7:
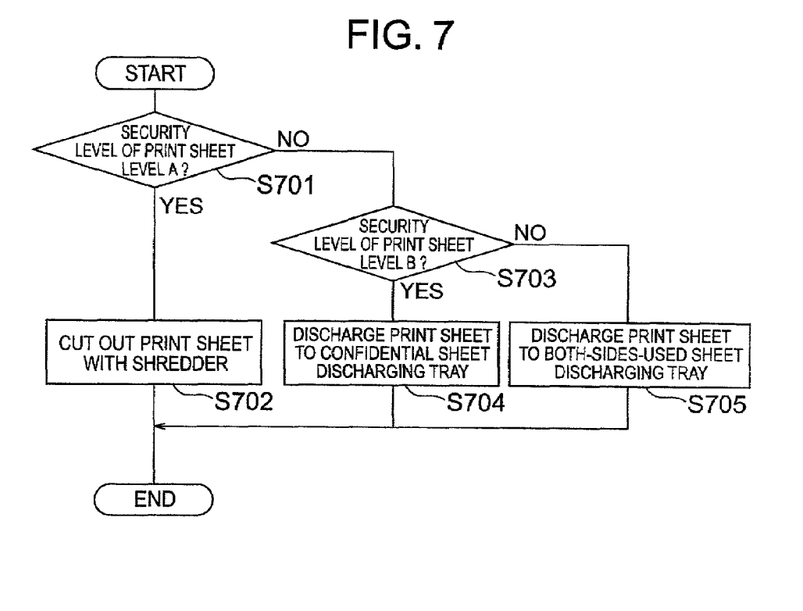
FIG. 7 is a flow chart showing how to sort out print sheets having both sides thereof already used.

If both the sides A and B of the fed print sheet have already been used, it is determined that the print sheet is unsuitable for printing. Then, the transportation path branching mechanism a 231 feeds the print sheet to the sheet transportation path c 222, and the transportation path branching mechanism b 232 further feeds the print sheet to the sheet transportation path d 223. The print sheet is discharged via the sheet transportation path i 228 (S613). At this time, the print sheet may be fed and discharged to a different destination depending on the security level of the print sheet, for example, as shown in the flow chart in FIG. 7. It is judged whether or not the print sheet has the security level A (S701). If the print sheet has the level A, it is fed to the shredder 219, where it is immediately cut out (S702). If the print sheet does not have the security level A, it is judged whether or not the print sheet has the security level B (S703). If the print sheet has the security level B, it is discharged to the confidential sheet discharging tray 218 (S704). If the print sheet does not have the security level B, that is, it has the security level C or lower, it is discharged to the both-sides-used sheet discharging tray 217 (S705). It is preferable that such selection of the destination of sheet discharging in accordance with the security level of the print sheet may be adapted so that the user can beforehand arbitrarily set by the host apparatus, the operation panel, or the like. Once a print sheet having both sides thereof already used is discharged, another print sheet is fed from the sheet tray (S601), and it is determined again whether or not the fed print sheet is suitable for printing.

Figure 8:
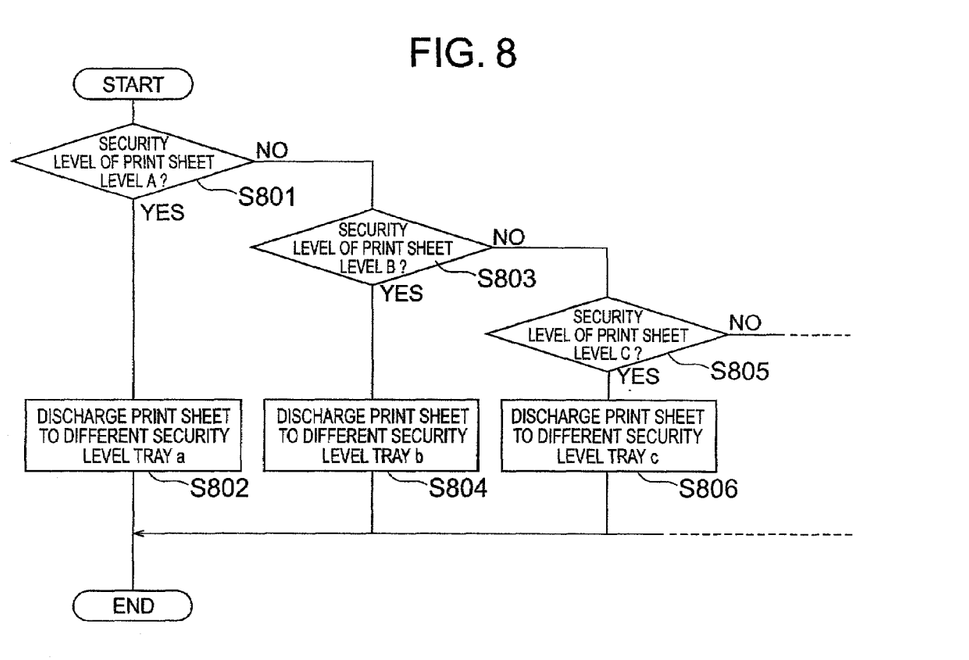
FIG. 8 is a flow chart showing how to sort out print sheets which have a side A or a side B thereof unused and which have a security level higher than that of print data.

If the fed print sheet has the side A thereof unused and the print data has a lower security level than the print sheet, then it is judged that the fed print sheet is unsuitable for printing the present print data but can be used for another printing operation. Then, the transportation path branching mechanism a 231 feeds the print sheet to the sheet transportation path c 222, and the transportation path branching mechanism b 232 further feeds the print sheet to the sheet transportation path d 223. Then, the transportation path branching mechanism c 233 further feeds the print sheet to the sheet transportation path f 225 to discharge it to the corresponding different security level tray (S612). At this time, as shown in the flow chart in FIG. 8, a destination of sheet discharging is selected according to the security level of the print sheet. It is determined whether or not the print sheet has the security level A (S801). If the print sheet has the security level A, it is discharged to the different security level tray a 234 (S802), and if the print sheet does not have this level A, it is determined whether or not the sheet has the security level B (S803). If the print sheet has the security level B, it is discharged to the different security level tray b 235 (S804). If the print sheet does not have the security level B, it is determined whether or not the print sheet has the security level C (S805). If the print sheet has the security level C, it is discharged to the tray by security levels c 236. If there are more security levels, the number of trays by security levels may be increased. Then, another print sheet is fed from one of the sheet trays (S601), and it is determined again whether or not the fed print sheet is suitable for printing.

If the fed print sheet has the side B thereof unused and the print data has a lower security level than the print sheet, then it is determined that the fed print sheet is unsuitable for printing the present print data but can be used for another printing operation and that the print surface is set in an opposite direction. Then, the transportation path branching mechanism a 231 feeds the print sheet to the sheet transportation path c 222, the transportation path branching mechanism b 232 further feeds the print sheet to the sheet transportation path d 223, and the switchback mechanism a 229 reverses the direction of the printed surface of the print sheet (S611). Then, after the print sheet has traveled through the sheet transportation path e 224, the transportation path branching mechanism c 233 feeds it to the sheet transportation path f 225 to discharge it to the corresponding tray by security levels (S612). At this time, as shown in the flow chart in FIG. 8, the destination of sheet discharging is selected in accordance with the security level of the print sheet. This is the same as that described above. Then, another print sheet is fed from one of the sheet trays (S601), and it is determined again whether or not the fed print sheet is suitable for printing.

Figure 9:
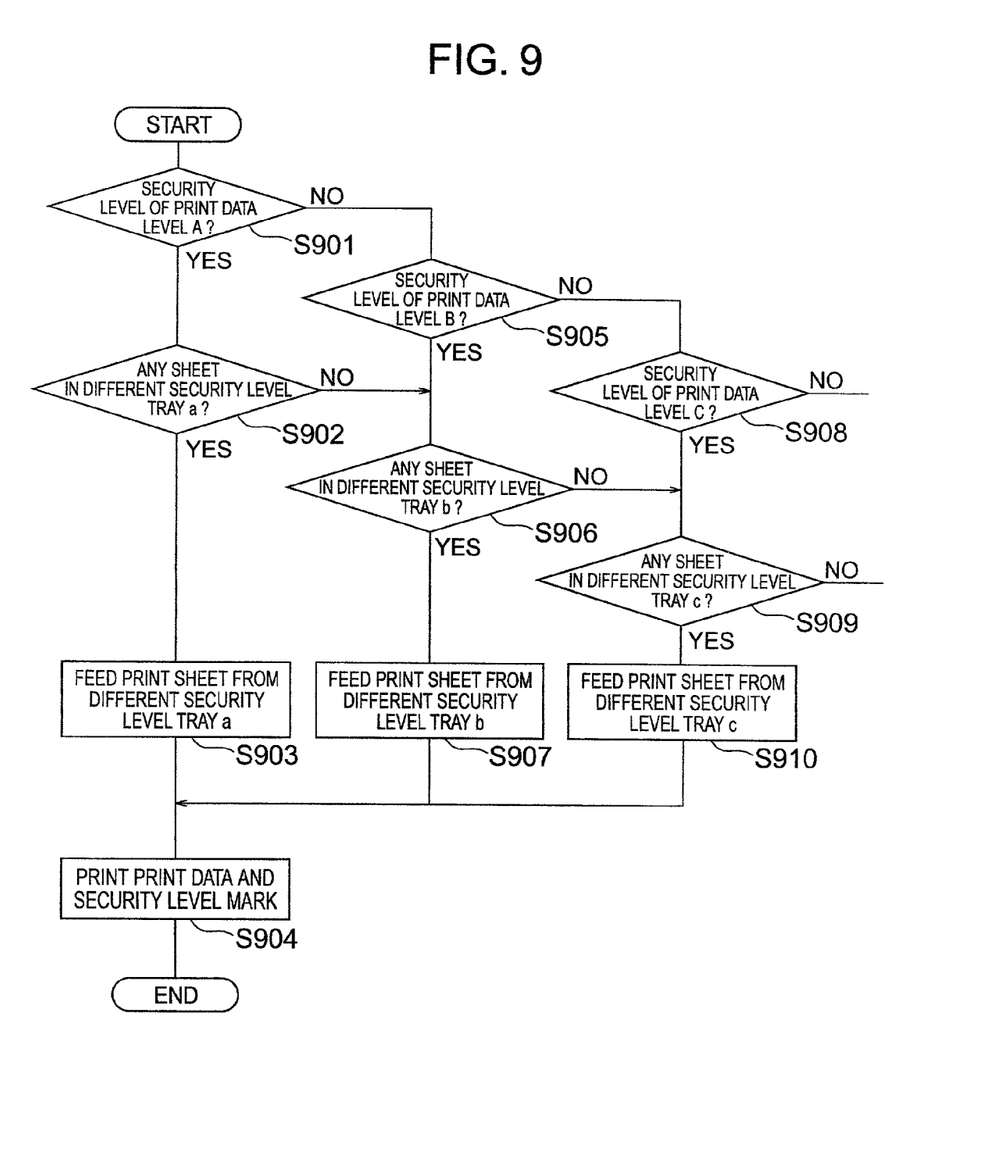
FIG. 9 is a flow chart showing a sheet feeding method used to feed print sheets from trays by security levels.

The print sheets sorted out by security levels and then discharged to the trays by security levels can be used for another print page or job. This will be described with reference to the flow chart shown in FIG. 9, showing a method of feeding a print sheet from the trays by security levels. First, the security level of print data to be printed is determined (S901, S905, and S908). If the print data has the security level A, it is determined whether or not there are any print sheets in the tray by security levels a, in which print sheets with the security level A are stored (S902). If the tray by security levels a contains any print sheets, one of them is fed therefrom (S903). If the tray by security levels a contains no print sheet, then it is determined whether or not there is any print sheet in the tray by security levels b, in which print sheets with the security level B are stored (S906). If the tray by security levels b contains any print sheets, one of them is fed therefrom (S907). If the tray by security levels b contains no print sheet, then it is determined whether or not there are any print sheets in the tray by security levels c, in which print sheets with the security level C are stored (S909). If the print data has the security level B, it is sequentially determined whether or not the trays by security levels b and c contain any print sheets (S906 and S909). If the print data has the security level C, determination of the presence of print sheets is started with the tray by security levels c (S909). If there are more security levels, the number of the trays by security levels may be increased. This is the same as that described above. In this manner, determination of the presence of print sheets is started with a tray by security levels storing print sheets with a security level equivalent to that of the print data. If this tray by security levels contains no print sheet, then it is sequentially determined according to the order of the security level whether or not there are any print sheets in trays by security levels storing print sheets with lower security levels, thereby determining a tray by security levels from which a print sheet is to be fed. The print sheets stored in the respective trays by security levels do not include those having both sides thereof already used, have been sorted out by security levels, and are stored so that their sides A face downward. Correspondingly, the attributes of print sheets such as the use status of each printed surface and security level information need not be detected by the printed surface detecting sensors or security level mark readers. Thus, the fed print sheet can be printed without the need to be detected the attributes thereof (S904), thereby increasing the overall printing speed.

The main role of printers or copiers is printing. Accordingly, while not performing any printing operation, it is general that the printer waits for an instruction for the next printing. A function may be provided which sorts out print sheets in advance utilizing such a print waiting state. That is, the used print sheets fed to the sheet trays are sorted out and stored in the both-sides-used sheet discharging tray, confidential sheet discharging tray, and trays by security levels. The print sheets are sorted out on the basis of the attributes thereof such as the use status of each printed surface and the security level of each print sheet by the printed surface detecting sensors and security level mark readers. The sorting operation may be started by an instruction from the host apparatus or the operation panel or may be automatically started by the printer while it is not performing any printing operation. Thus, the fed print sheet can be printed without need to detect the attributes thereof, thereby increasing the overall printing speed. This is the same as that described above.

Figure 10:
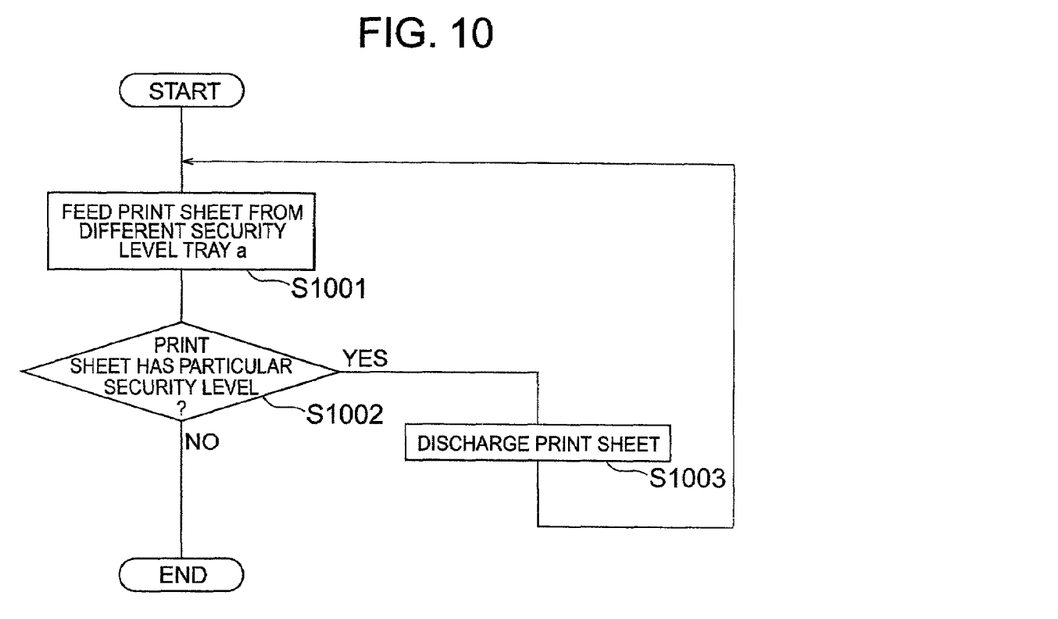
FIG. 10 is a flow chart showing how to sort out print sheets with a particular security level.

The user can arbitrarily determine the level (range) of confidentiality of each security level and the number of security levels. This is the same as described above. However, if for example, confidential information is classified into a security level A at which the confidential information must be secured only within a particular range of a certain section of a certain company, a security level B at which the confidential information must be secured only within the certain section of the certain company, a security level C at which the confidential information must be secured only within the certain company, and a security level D at which the print data contains no confidential information, it is assumed that there are several types of print data corresponding to the security level A. That is, confidential information that must be secured within a group X of the certain section of the certain company is also classified into the security level A, and confidential information that must be secured within a group Y of the certain section of the certain company is also classified into the security level A. Accordingly, an problem occurs that, if a print sheet with print data containing confidential information that must be secured within the group X is used as a one-side-used print sheet on which print data is printed which contains confidential information that must be secured within the group Y, the confidential information may leak out. Thus, the system can be adapted so that print sheets with a particular security level can be recovered or cut out unconditionally regardless of whether or not the print sheets are reused as one-side-used ones. FIG. 10 shows a flow chart showing how to recover a print sheet with a particular security level. First, a print sheet is fed from one of the sheet trays in response to a print instruction (S1001). Then, the security level of the fed print sheet is detected to determine whether the sheet has the particular security level (S1002). It is preferable that the system is adapted so that the user can arbitrarily determine the particular security level and set it from the operation panel or the like. If the fed print sheet has the particular security level, it is discharged (S1003) and another print sheet is fed from one of the sheet feeding trays. The print sheet with the particular security level may be discharged to, for example, the confidential sheet discharging tray 218 or to the shredder 219 for immediate cutout. It is preferable that the system may be adapted so that the user can arbitrarily set, from the host apparatus, the operation panel, or the like beforehand, the destination to which the print sheet with the particular security level is discharged. The previously described problem that confidential information may leak out is solved by replacing the flow chart shown in FIG. 10 with step S601 in the flow chart shown in FIG. 6.

Furthermore, the problem that may occur when print sheets for different groups are reused as described above can also be solved as follows. As print matter attributes, manager information is provided in addition to the security level, and whether or not the print sheet can be printed can be determined from the print matter attributes specified by the host apparatus before printing and the print matter attributes of the print sheet. Examples will be described in detail with reference to FIGS. 11 to 13.

Figure 11:
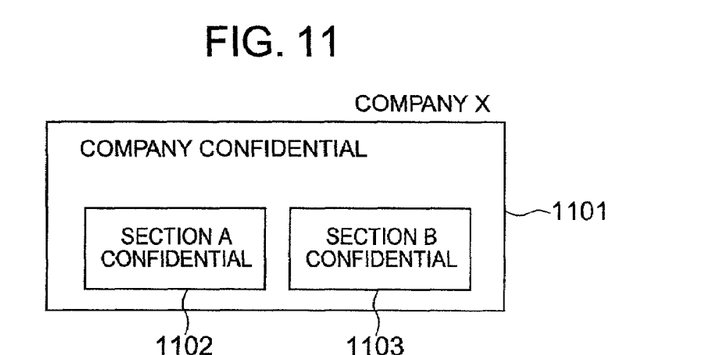
FIG. 11 is a diagram showing an example of handling of a security of print sheets.

FIG. 11 is a diagram used to describe the user's environment to which the present example is applied. A company X 1101 is assumed to have a section A 1102 and a section B 1103. The information in print matter produced by the company X is classified into two security levels: "company confidential" information that is secured inside the company X and "unrestricted" information that need not be secured outside the company X. Furthermore, the sections A 1102 and B 1103 inside the company X have "section confidential" information.

Figure 12:
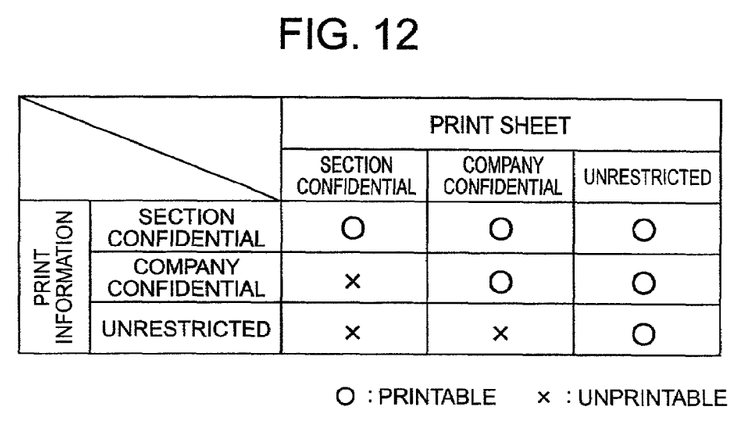
FIG. 12 is a table showing an example of a combination of print information and print matter attributes of reused sheets.

Here, as described above, if the section A is to reuse a print sheet, whether or not the print sheet can be printed is determined as shown in FIG. 12 on the basis of the print matter attributes of the print data (print information) and of the print sheet (print sheet). In FIG. 12, circles indicate that the print sheet can be printed, whereas crosses indicate that the print sheet cannot be printed. It is assumed that the section A's "section confidential" print data can be printed on a print sheet with any of the "section confidential", "company confidential", and "unrestricted" print matter attributes. Further, it is assumed that the section A's "company confidential" print data cannot be printed on a print sheet with the "section confidential" print matter attribute but can be printed on a print sheet with either the "company confidential" or "unrestricted" print matter attribute. Furthermore, the section A's "unrestricted" print data can be printed only on a print sheet with the "unrestricted" print matter attribute.

As described above, a company generally has a plurality of sections each possessing a printer. If each section manages the reuse of print sheets, the leakage problem will not occur but there is a problem that the reuse rate of print sheets cannot be increased. However, if the conditions shown in FIG. 12 are used to determine whether or not a print sheet can be printed, the confidential information may leak out if the section A attempts to reuse the section B' print sheet. That is, if the section A's print data is printed on the section B's already printed sheet, the section B's confidential information may leak out to the section A, though this print sheet has the "section confidential" print matter attribute.

Figure 13:
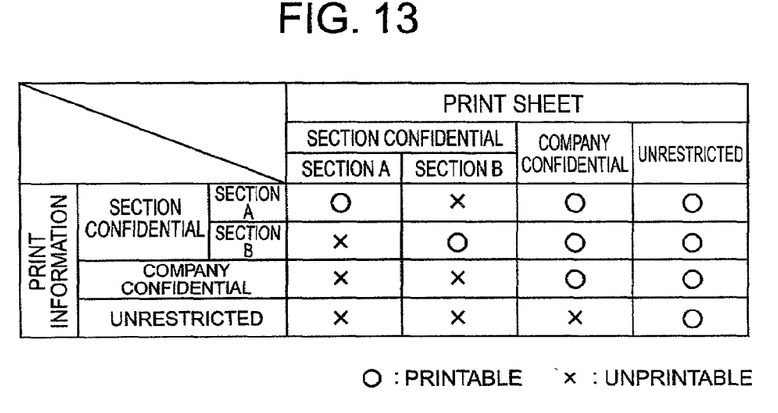
FIG. 13 is a table showing another example of a combination of print information and print matter attributes of reused sheets.

To solve this problem, the security level and manager information are used as print matter attributes when it is determined whether or not a print sheet can be printed so that this combination can be used for the determination as shown in FIG. 13. The section A's print data having the "section confidential" security level and for which the manager information is indicative of the "section A" is not printed on a print data having the "section confidential" security level and for which the manager information is indicative of the "section B". Moreover, the section B's print data having the "section confidential" security level and for which the manager information is indicative of the "section B" is not printed on a print data having the "section confidential" security level and for which the manager information is indicative of the "section A". By thus using the security level and manager information as print matter attributes, the need for the sections A and B to manage their respective print sheets is eliminated, thus increasing the reuse rate of print sheets.

Alternatively, the system can be adapted in such a manner that manager information is used as a print matter attribute so that printing will not be carried out if the manager information on the print data differs from the manager information on the print sheet.

According to the present invention, when print sheets with confidential information are to be reused, the reuse rate of the used sheets can be increased while securing the confidential information.

It should be further understood by those skilled in the art that the foregoing description has been made on embodiments of the invention and that various changes and modifications may be made in the invention without departing from the spirit of the invention and the scope of the appended claims.

What is claimed is:

1. A printer that prints print data on an unprinted surface of a previously-printed print sheet, comprising:
   means for inputting print matter attribute information including at least security level information of the print data;
   means for detecting a previous print matter attribute of the previously-printed print sheet; and
   print-determining means for determining whether or not the print data can be printed on the previously-printed print sheet, on a basis of the print matter attribute information of the print data and the previous print matter attribute of the previously-printed print sheet.

2. The printer according to claim 1, comprising means for returning the previously-printed print sheet to a sheet feeding section if the print determining means determines that the print data cannot be printed.

3. The printer according to claim 1, comprising means for printing a print matter attribute mark on a previously-printed print sheet on a basis of the print matter attribute information when the print data is printed, after determining that the print data can be printed.

4. The printer according to claim 1, comprising means for returning the previously-printed print sheet to one of a plurality of security level trays provided in a sheet feeding section, after the print determining means determines that the print data cannot be printed.

5. The printer according to claim 1, wherein the previously-printed print sheet includes security level information of the printed data.

6. The printer according to claim 1, wherein the previous print matter attribute is a previous print matter attribute mark on the previously-printed print sheet.

7. The printer according to claim 1, wherein the print matter attribute includes at least a security level of print contents, and if the security level of the print data is equal to or higher than that of the previously-printed print sheet, printing is carried out.

8. The printer according to claim 1, wherein the print matter attribute includes at least a security level of print contents and manager information regarding an ownership entity of the print data, and even if the security level of the print data is equal to or higher than that of the previously-printed print sheet, printing is not carried out if the print data and the previously-printed print sheet have different pieces of manager information.

9. A print control method of printing print data on an unprinted surface of a previously-printed print sheet, comprising:
   inputting a print matter attribute of the print data;
   obtaining a previous print matter attribute of the previously-printed print sheet; and
   determining whether or not the print data can be printed on the previously-printed print sheet, on a basis of the input print matter attribute of the print data and the obtained print matter attribute of the previously-printed print sheet.

10. The print control method according to claim 9, wherein the print matter attribute includes at least a security level of print contents, and if the security level of the print data is equal to or higher than that of the previously-printed print sheet, printing is carried out.

11. The print control method according to claim 9, wherein the print matter attribute includes at least a security level of print contents and manager information regarding, an ownership entity of the print data, and even if the security level of the print data is equal to or higher than that of the previously-printed print sheet, printing is not carried out if the print data and the previously-printed print sheet have different pieces of manager information.

12. The print control method according to claim 9, comprising printing a print matter attribute mark on a previously-printed print sheet on a basis of the print matter attribute information, when the print data is printed after determining that the print data can be printed.

13. The method according to claim 9, comprising returning the previously-printed print sheet to a sheet feeding section if the determining determines that the print data cannot be printed.

14. The method according to claim 9, wherein the previous print matter attribute is a previous print matter attribute mark on the previously-printed print sheet.

* * * * *